Figure 1:
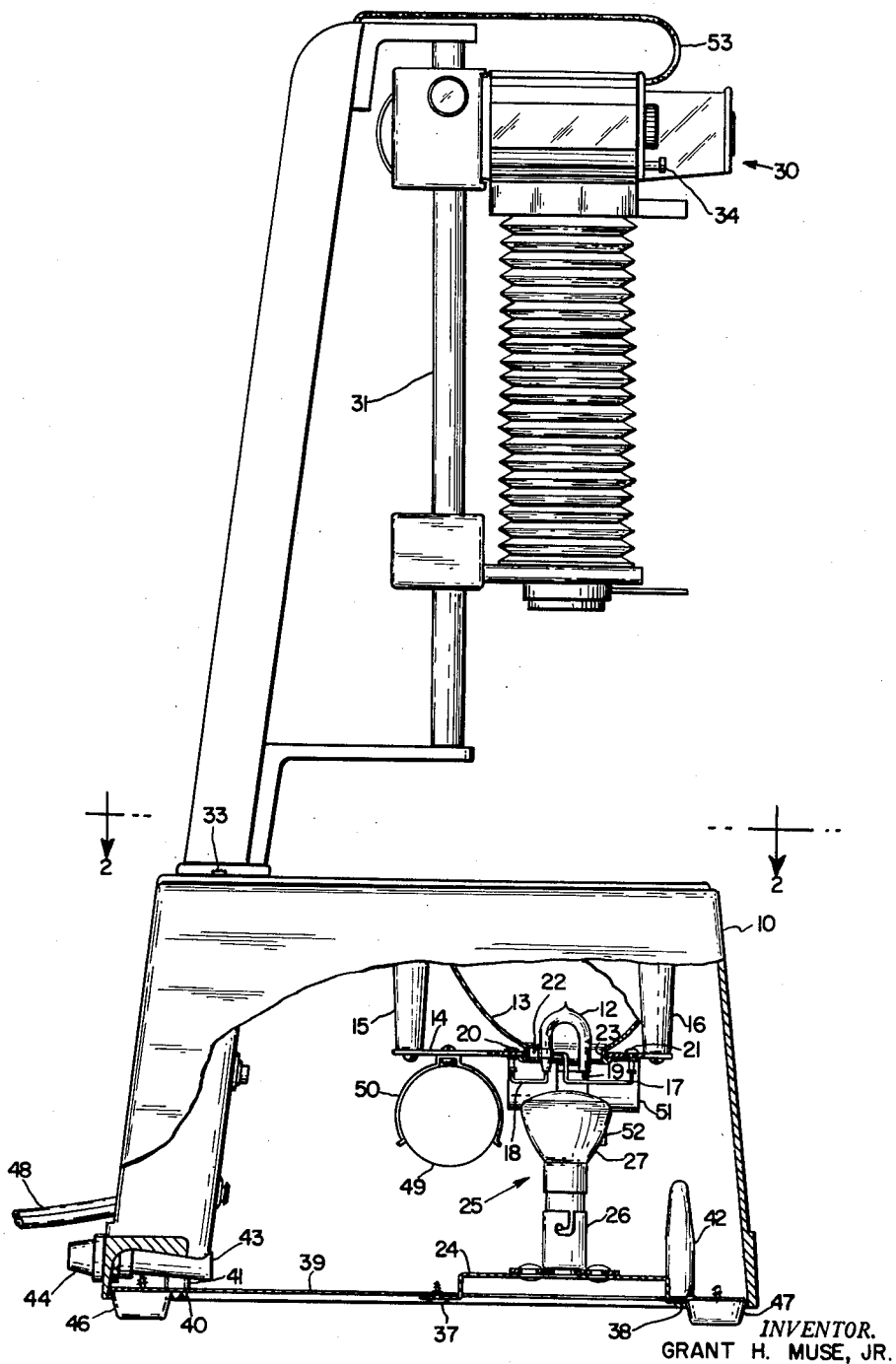

Oct. 30, 1962   G. H. MUSE, JR   3,060,796
PHOTOGRAPHIC COPYING APPARATUS
Filed April 24, 1958   2 Sheets-Sheet 2

INVENTOR.
GRANT H. MUSE, JR.
BY Francis A. Sim
ATTORNEY

3,060,796
PHOTOGRAPHIC COPYING APPARATUS

Grant H. Muse, Jr., Mirfield, England, assignor to Minneapolis-Honeywell Regulator Company, Minneapolis, Minn., a corporation of Delaware
Filed Apr. 24, 1958, Ser. No. 730,726
2 Claims. (Cl. 88—24)

The present invention is concerned with an improved photographic apparatus and more particularly with a photographic apparatus for use in copying photographic transparencies.

Among the more popular photographic cameras are the so-called miniature or 35 mm. cameras. These cameras can be used with the black and white type 35 mm. film which produces a transparent photographic negative from which black and white photographic positives are normally printed. However, in many cases this camera is used with film which produces a color diapositive, of which a film sold under the tradename Kodachrome is an example. This last mentioned type of film produces a positive color transparency (diapositive) and the user of the camera ordinarily derives only a single transparency, or slide, from each exposure made with the camera. If further transparencies are desired, or if a portion of the original transparency is to be cropped and enlarged to the full format of the 35 mm. camera, it is necessary to resort to either a trial and error copying method or to the use of very complex and expensive duplicating apparatus.

The present invention is concerned with providing a simple and inexpensive photographic apparatus for use in copying photographic transparencies, which apparatus is at least as reliable as the more expensive and complex equipment presently used to copy transparencies on a large scale commercial basis. In copying a photographic transparency, it is necessary to first align the transparency to be copied with the copying camera and then to properly focus the copying camera, to thereby produce an acceptable copy of the original transparency. It is an object of the present invention to provide an improved photographic apparatus for use in copying a photographic transparency wherein the light source of a photographic flash unit and its reflector are mounted to illuminate the transparency to be copied, and in which the reflector is provided with an opening at the apex thereof such that a secondary light source may be mounted in alignment with this opening to also illuminate the transparency to be copied, to thereby facilitate positioning and focusing of the copying camera prior to the energization of the flash unit during the copying operation.

It is a further object of the present invention to provide an improved photograpric apparatus having a housing with an opening therein which is adapted to receive a photographic transparency to be copied, the housing being provided with an electronic flash unit whose source of illumination is mounted with respect to a reflector, and with the reflector provided with a large opening in the apex thereof such that the light from a second source of illumination positioned in alignment with the opening in the reflector may pass through the reflector and illuminate the transparency to be copied, and thereby facilitate focusing of the copying camera.

It is a further object of the present invention to provide an improved photographic apparatus for use in copying a photographic transparency having a housing with an opening therein and a removable cover member, the housing enclosing a high voltage electronic photographic flash unit whose photographic flash tube is positioned in alignment with the opening in the housing, and also providing a second relatively low voltage source of illumination mounted on a cover member in alignment with the opening of the housing to thereby provide illumination of the transparency to be copied to facilitate proper adjustment of the copying camera and to also allow removal of the relatively low voltage source of illumination such that this source of illumination may be readily replaced without necessitating that the photographer come in close proximity of the high voltage leads of the electronic flash tube or related components.

It is a further object of the present invention to provide a unique and compact construction whereby a mounting card having an opening therein includes a plurality of electrical contacts which mount a high voltage flash tube in the opening, and which includes a cup-shaped reflector having an opening in the apex thereof encircled by an angular ridge formed at the apex, the reflector being mounted on the mounting card by having the angular ridge crimped to grasp the edge of the opening in the mounting card.

Figure 2:
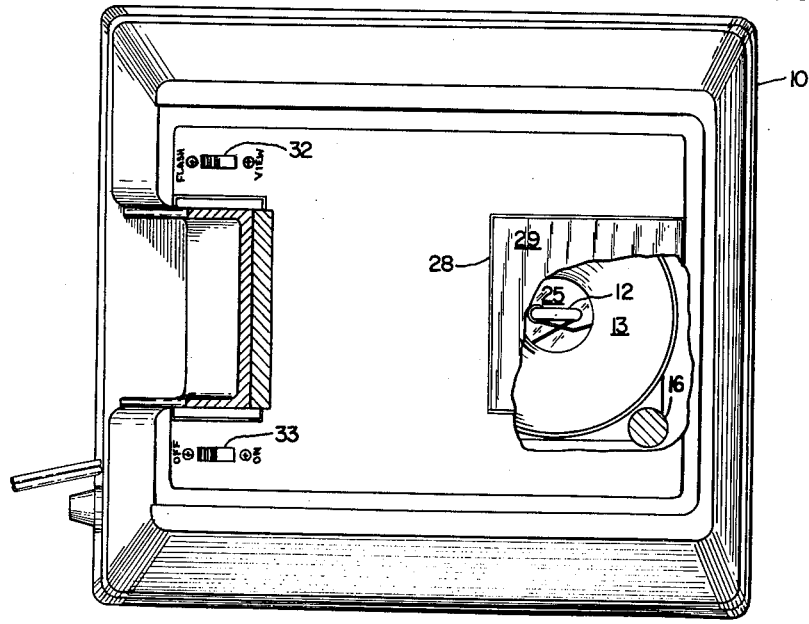
Figure 3:
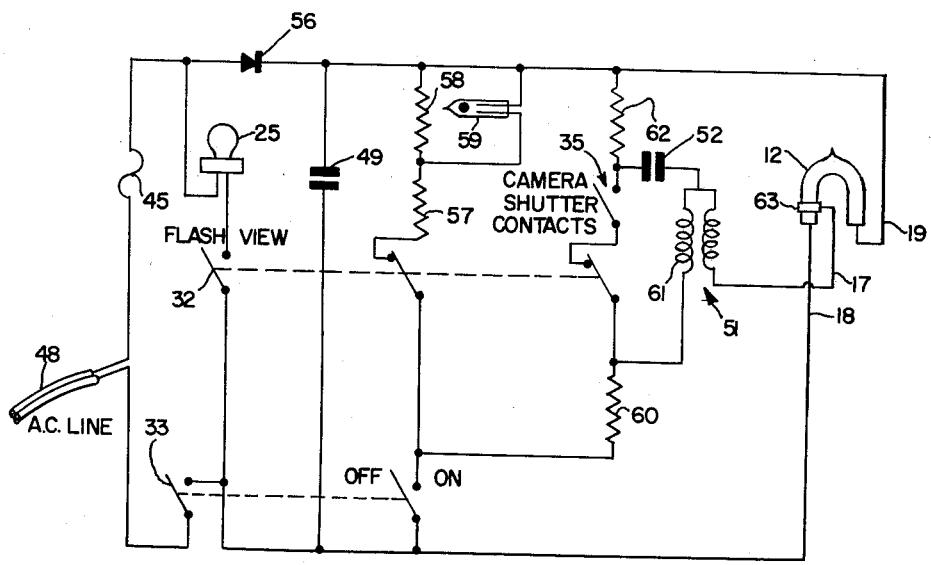

These and other objects of the present invention will be apparent to those skilled in the art upon reference to the following specification, claims and drawing, of which:

FIGURE 1 is a perspective view of the improved photographic apparatus, showing the copying camera and showing a portion of the housing broken away to expose the source of illumination of the photographic flash apparatus, its reflector, and the second source of illumination, FIGURE 2 is a view of the apparatus of FIGURE 1 taken along the line 2—2, and FIGURE 3 is a schematic diagram showing the electrical circuitry of the apparatus of FIGURE 1.

Referring specifically to FIGURE 1, the reference numeral 10 designates a housing which is a box like member forming the base of the apparatus. This housing 10, is a hollow housing and houses the electrical components of an electronic flash apparatus including an electronic flash tube 12 and its reflector 13. Flash tube 12 and reflector 13 are mounted on a mounting card or base member constructed of electrical insulating material and identified by the reference numeral 14. This member 14 is mounted on the housing 10; by means of mounting posts, two of which are identified by the reference numerals 15 and 16; or by any other such convenient means which will insure the proper orientation of member 14 relative to housing 10.

A unique and simple method of mounting the flash tube 12 in relation to its reflector 13 has been devised and is shown in FIGURE 1. From this figure it can be seen that the flash tube 12 is provided with a plurality of rigid electrical conductors, identified by the reference numerals 17, 18 and 19. These electrical conductors are fastened, as by soldering, to a plurality of terminal posts which are attached to the mounting board 14. Two of these terminal posts are identified by the reference numerals 20 and 21. The mounting board 14 is provided with a relatively large opening therein identified by numeral 22. This opening receives the flash tube 12 and also provides a surface against which reflector 13 is mounted. Reflector 13 is likewise provided with a large opening at the apex thereof and this opening in the reflector is encircled by an annular ridge 23 which has been crimped to attach the reflector 13 to the mounting board 14.

The housing 10 of FIGURE 1 is also provided with a removable plate or cover member 24. This cover member mounts a second source of illumination 25 in the form of an incandescent bulb which is mounted in a socket 26 attached to the cover member 24. This incandescent bulb 25 is provided with a reflective surface 27 such that the bulb has its light focused into a relatively narrow beam which is directed in an upward direction past flash tube 12 and through the opening in reflector 13. It can be seen from FIGURE 1 that the opening in reflector 13 is large enough to allow the major portion of the illumination from the source 25 to pass through the reflector.

Referring now to FIGURE 2, it can be seen that the housing 10 has an opening 28 provided in the top surface thereof. This opening is closed by one or more transparent sheets of material 29, of which sheets one would generally be frosted glass. FIGURE 2 shows a portion of the housing and the frosted glass 29 broken away to thereby show the top view of the electronic flash tube 12, its reflector 13 and the incandescent bulb 25, thereby more clearly showing how the glass plate 29 is illuminated both by the incandescent source 25 and the electronic flash tube 12.

A detailed description of the operation of the apparatus as disclosed in FIGURE 1 can be found in the copending application of Grant H. Muse, Jr., filed Apr. 24, 1958, Serial No. 730,686, now U.S. Patent No. 2,983,189, issued May 9, 1961. For the purpose of this application, it suffices to say that the photographic transparency to be copied is placed on the member 29 and is copied by means of a single lens reflex camera identified by the reference numeral 30 of FIGURE 1. This camera 30 is positioned along a mounting means comprising a pair of rods, one of which is shown in FIGURE 1 and identified by the reference numeral 31. In the operation of the apparatus of FIGURE 1, the photographic transparency to be copied is first placed on the member 29 of FIGURE 2. The single throw triple pole switch 32 of FIGURES 2 and 3 is then placed in the "view" position and, as will be described, the incandescent bulb 25 is thereby energized. The light from this bulb passes up through the opening 22 in reflector 13 and illuminates the transparency to be copied. The photographer then views this transparency through the view finder of the single lens reflex camera 30. This allows the photographer to position the transparency and to focus the camera by moving the components of the camera along the rods 31.

Once the transparency to be copied is positioned on the member 29 in accordance with the desires of the photographer, and once the camera 30 has been focused, the switch 32 is moved to the "flash" position. The electronic flash apparatus contained in housing 10 is now conditioned to be selectively energized upon actuation of the shutter actuator 34 of camera 30. Camera 30 is provided with a pair of shutter contacts which are moved to the closed position by the camera shutter upon its actuation by means of member 34. These camera shutter contacts are identified on the circuit diagram of FIGURE 3 by the reference numeral 35.

The actuation of the shutter contacts 35 by the camera shutter when it is actuated by member 34 synchronizes the action of the shutter of camera 30 with the energization of the electronic flash tube 12 of FIGURE 1. The light provided by this flash tube is focused by means of reflector 13 to illuminate the transparency to be copied. In this manner, the transparency is copied by means of the film contained in the copying camera 30.

From the above description, it can be seen that I have provided a compact and unique construction wherein the high voltage electronic flash tube 12, its reflector 13, and the relatively low voltage bulb 25 are aligned with the opening 28 provided in the housing 10. Furthermore, I have provided a construction whereby the removable cover member 24 may be removed by means of screws 37 and 38. This construction facilitates the removal of the relatively low voltage bulb 25 from the socket 26 when this bulb burns out. As is well known the life of the electronic flash tube 12 is very long in comparison to the incandescent bulb 25 and periodically the bulb 25 will have to be replaced. The unique construction provided by the present invention allows this bulb 25 to be removed without necessitating that the photographer come in close proximity to the high voltage leads 17, 18 and 19 of the flash tube 12, thereby rendering the apparatus relatively safe.

Referring again to FIGURE 1, the housing 10 has the bottom portion thereof closed by a cover member 39 which is attached to the sides of the housing 10 by means of screws such as 40 which are threaded into bosses such as 41 and 42 formed in the side of the housing.

The reference numeral 43 of FIGURE 1 designates a fuse housing which is provided with a removable cap 44 which houses a replaceable fuse, identified by the reference numeral 45 of FIGURE 3. The apparatus of FIGURE 1 is also provided with a plurality of resilient feet two of which are shown and designated by the reference numerals 46 and 47. The reference numeral 48 of FIGURE 1 designates a power cord for the apparatus which is adapted to be connected to the source of alternating current, not shown.

The electrical components making up the circuit of FIGURE 3, are mounted on the mounting card 14 and for the purpose of illumination, a number of these units are shown in FIGURE 1. The reference numeral 49 of FIGURE 1 designates a high voltage electrolytic storage capacitor which is mounted on mounting card 14 by means of a mounting bracket 50 which is riveted to this card. The reference numeral 51 of FIGURE 1 designates the trigger coil 51 of the circuit of FIGURE 3 whereas the reference numeral 52 of FIGURE 1 designates the trigger capacitor 52 of FIGURE 3.

The elements 49, 50, 51 and 52 have been shown in their relation to the card 14 in FIGURE 1 as an example of the manner in which the electrical components of the circuit of FIGURE 3 are mounted and positioned in the housing 10. Referring now specifically to FIGURE 3, this figure shows in electrical circuit form the electronic flash apparatus contained in the housing 10 of FIGURE 1. Operating voltage is derived from the alternating circuit line, identified by the reference numeral 48. This alternating current is rectified by means of rectifier 56 and capacitor 49 is charged thereby. Capacitor 49 is directly connected to conductors 18 and 19, which are connected to the main electrodes of the gas discharge flash tube 12. Thereby, capacitor 49 is connected to be discharged as an arc through this flash tube to produce a brilliant flash of light.

Also connected across capacitor 49 is a bleeder resistor network including resistors 57 and 58. Resistor 58 has a neon ready light 59 in parallel therewith, this light functioning to indicate the state of charge of capacitor 49. A further network is connected across capacitor 49 and consists of series connected resistor 60, the primary winding 61 of trigger coil 51, trigger capacitor 52, and resistor 62.

Operation of the apparatus is controlled by means of the "on-off" switch 33 shown in both FIGURES 2 and 3. When this switch is moved to the "on" position, and with the switch 32 in the "view" position, the incandescent bulb 25 is energized such that the transparency to be copied is illuminated for proper orientation and the camera 30 may then be properly adjusted for focus and for the desired degree of magnification of the image. Also, when switch 33 is placed in the "on" position, capacitor 49 is charged and the triggering capacitor 52 is charged through a circuit including resistor 60, primary winding 61, capacitor 52 and resistor 62.

As per above, capacitor 49 is charged. However, the switch 32 in the "view" position maintains the circuit to the ready light 59 open so that this light indicates the apparatus is not in a condition to produce energization of flash tube 12. Also, the circuit to the camera shutter contacts 35 is open so long as switch 32 is in the "view" position. Once the photographer has properly aligned the transparency to be copied and has focussed camera 30, switch 32 is placed in the "flash" position. This completes a circuit connecting the ready light 59 to capacitor 49 and the ready light is energized to indicate that the apparatus is in a condition to produce energization of flash tube 12. Simultaneously, a discharge circuit for capacitor 52 is partially completed. Therefore, the photographer may now actuate member 34 of camera 30 to actuate the shutter of the camera and thereby simultaneously close the shutter contacts 35 shown in FIGURE 3. This then completes a circuit whereby capacitor 52 is discharged through the primary winding 61 of trigger coil 51. A high voltage pulse is applied between the triggering electrode 63 of flash tube 12 and the electrode connected to conductor 18. As is well known, this produces ionization of the inert gas in the flash tube 12 and capacitor 49 is discharged through the flash tube to produce a brilliant flash of light, illuminating the slide to be copied, this light entering the lens of the camera to reproduce the transparency on the film within the camera 30.

From the above explanation it can be seen that I have provided a very reliable and yet inexpensive photographic apparatus for use in copying photographic transparencies. Furthermore, this apparatus utilizes a unique manner of illuminating the transparency to be copied not only by means of a high voltage electronic flash apparatus but also by a relatively low voltage light source such that the low voltage light source may be readily replaced without requiring the photographer to reach within the apparatus to the proximity of the high voltage conductors associated with the electronic flash apparatus. Furthermore, it can be seen that I have provided an extremely simple construction whereby the reflector for use with the electronic flash tube is readily mounted in relation thereto and a large opening is provided in the apex of the reflector to facilitate the projection of light from a second source of light through the opening, which second source of light illuminates the transparency to be copied for the purposes of orienting the transparency, adjusting the magnification, and focussing the camera prior to the actual copying of the transparency.

Other modifications of this invention will be apparent to those skilled in the art and it is intended that the scope of the present invention be limited solely by the scope of the appended claims.

I claim as my invention:

1. Photographic apparatus for use in copying a photographic trasparency comprising: a hollow housing member having a horizontally disposed opening in the top surface thereof, a copying camera having a lens, support means mounted at a fixed position to the exterior of said housing and having means mounting said copying camera for vertical movement with the lens above and in alignment with the opening in said housing, said camera being adjustably vertically movable to facilitate copying of the entire transparency or a portion thereof as desired, a horizontally disposed translucent member closing said opening and adapted to receive the photographic transparency to be copied, said transparency being horizontally movable to permit copying any portion thereof and remaining in any desired horizontal position by reason of the horizontal disposition of said translucent member, a high voltage electronic flash unit mounted within said housing having an electronic flash tube mounted directly beneath the opening in said housing, a reflector for said flash tube having an opening in the apex thereof adapted to receive said electronic flash tube, means mounting said reflector within said housing directly beneah the opening in said housing with said flash tube positioned within said reflector so that said reflector controls the light produced by said flash tube and directs the light out of the opening in said housing to thereby illuminate the transparency to be copied, synchronizing means controlled by said copying camera arranged to energize said electronic flash unit in synchronization with the actuation of the shutter of said copying camera, a low voltage viewing source of illumination, means mounting said viewing source of illumination within said housing directly beneath said opening, behind the apex of said reflector, and in alignment with the opening therein, the light produced by said viewing source of illumination thereby passing through the openings in said housing to facilitate the positioning of the transparency and the focussing of said copying camera, switch means having a single manual operator with a view position and a flash position, said switch means being effective in said view position to render said flash unit inoperative while said viewing source of illumination is energized, and being effective in said flash position to condition said flash unit for energization by said synchronizing means, said housing member having a bottom wall, a removable cover member in said bottom wall, and means mounting said viewing source of illumination on the inside surface of said cover member whereby removal of said cover member also removes said viewing source of illumination from the vicinity of said high voltage flash tube for the purpose of replacement of said viewing source of illumination.

2. Photographic apparatus for use in copying a photographic transparency comprising: a hollow housing member having a horizontally disposed opening in the top surface thereof, a copying camera having a lens, support means mounted at a fixed position to the exterior of said housing and having means mounting said copying camera for vertical movement with the lens thereof above and in alignment with the opening in said housing, said camera being adjustable vertically to facilitate copying of the entire transparency or a portion thereof as desired, a horizontally disposed translucent member closing said opening and adapted to receive the photographic transparency to be copied, said transparency being horizontally movable to permit copying any portion thereof and remaining in any desired horizontal position by reason of the horizontal disposition of said translucent member, a mounting card of insulating material having a plurality of electrical contacts thereon and an opening in said card, means mounting said card in said housing with said opening in said card aligned with the opening in said housing, an electronic flash tube having a plurality of relatively rigid conductors and mounted in the opening in said card by means of said conductors which are secured to the contacts on said card and support said tube, a reflector for said flash tube having an opening in the apex thereof, said reflector being supported on said card with the lower portion thereof extending through the opening in said card and being secured thereto, said reflector and said flash tube being in alignment with the opening in said housing with said flash tube positioned within said reflector so that said reflector controls the light produced by said flash tube and directs the light out of the opening in said housing to thereby illuminate the transparency to be copied, synchronizing means controlled by said copying camera arranged to energize said electronic flash tube in synchronization with the actuation of the shutter of said copying camera, a viewing source of illumination, means mounting said viewing source of illumination within said housing behind the apex of said reflector and in alignment with the opening therein, the light produced by said viewing source of illumination thereby passing through the opening in said housing to facilitate the positioning of the transparency and the focusing of said copying camera, and switch means including a single manual operator having a view position and a flash position, said switch means being effective in said view position to render said flash tube inoperative while said viewing source of illumination is energized, and being effective in said flash position to condition said flash tube for energization by said synchronizing means.

(References on following page)

References Cited in the file of this patent

UNITED STATES PATENTS

| | | |
|---|---|---|
| 1,262,394 | Schickerling | Apr. 9, 1918 |
| 1,763,208 | Altman | June 10, 1930 |
| 1,894,004 | Rose | Jan. 10, 1933 |
| 1,923,181 | Albers | Aug. 22, 1933 |
| 2,005,761 | Speeg | June 25, 1935 |
| 2,053,317 | Billing | Sept. 8, 1936 |
| 2,112,449 | Proudfit | Mar. 29, 1938 |
| 2,324,842 | Huebner | July 20, 1943 |
| 2,664,038 | Canham | Dec. 29, 1953 |
| 2,825,795 | Henninger | Mar. 4, 1958 |
| 2,846,565 | Binkley et al. | Aug. 5, 1958 |
| 2,893,289 | Edgerton | July 7, 1959 |
| 2,895,378 | Budde | July 21, 1959 |

OTHER REFERENCES

"Copying Kodachrome" (Colman), Photo Technique, October 1941, page 31.